United States Patent Office 2,712,512
Patented July 5, 1955

2,712,512

INORGANIC STRUCTURAL SHEET MATERIAL

Lawrence P. Biefeld, Granville, and Marshall C. Armstrong, Hebron, Ohio, assignors to Owens-Corning Fiberglas Corporation, Toledo, Ohio, a corporation of Delaware No Drawing. Application April 17, 1951,
Serial No. 221,511

10 Claims. (Cl. 154—86)

This invention relates to the fabrication of structural products in the form of panels, boards or molded products with inorganic cements, such as magnesium oxysulphate or magnesium oxychloride and glass fiber reinforcement. It relates more particularly to the manufacture of a flexible, high strength, substantially void-free, low cost structural panel formed of readily available inorganic materials and it is an object of this invention to produce and to provide a method for producing products of the type described.

Another object is to produce and to provide a method for producing a panel of high strength formed of inorganic cements of the type magnesium oxysulphate reinforced and flexibilized by glass fibers and it is a related object to produce a material of the type described which is characterized by substantial freedom of voids, high heat resistance and the like such that it can be used for lath, insulation, wall board or table tops.

To make use of glass fibers as a high strength and inert reinforcement in molded or structural products, the industry has had to rely on the use of organic resinous substances and plastics as the bonding agent or base in which the fibers are disposed to form a composite mass. Because of the temperature limitation imposed by the resinous component and the difficulty experienced in developing a suitable bonding relation between resinous materials and glass fibers, especially under high humidity conditions, application of such compositions are limited. The use of inorganic materials as the binder in structural panels or boards has met with considerable discouragement because of the brittle character of the cured cement coupled with their apparent low strength.

It has been found that a material of construction of the type described characterized by high strength, flexibility in thin sections, nailability and formability may be formed of low cost and readily available inorganic materials based upon the use of glass fibers in combination with magnesium oxysulphate cement preferably modified with mineral aggregates such as sand, silica, slate, milled glass and the like and in which glass fibers function uniquely to impart strength and flexibility to the normally inflexible and brittle cementitious composition.

In practice, the desired results are obtained when the magnesium oxysulphate cement is formed of magnesium oxide and magnesium sulphate ($MgSO_4 \cdot 7H_2O$) present in the ratio of 3–9 mols magnesium oxide to 1 mol magnesium sulphate with sufficient water being present to provide at least 11 mols of combined water. Marked improvement is secured when aggregate is present in the ratio of 2–6 parts by weight aggregate to one of magnesium oxide. The amount of glass fiber reinforcement should be in excess of 3 percent by weight of the final product and it is desirable to introduce as much glass fiber as possible, as will hereinafter appear. The amount that can be introduced is limited by the high viscosity of the slurry formed by the cement and aggregate into which the glass fibers are introduced but 6–10 percent by weight is usually preferred. Under ordinary conditions as much as 15 percent by weight glass fibers may be incorporated and the concentration can be increased by the use of pressure to introduce as much as 27 percent by weight.

Calcined magnesia from various sources, such as from sea water or natural deposits, may be used but it is preferred to make use of calcined brucite, such as that derived from the brine at Ludington, Michigan. The latter material is more desirable because the magnesia that is formed exists as rounded particles of relatively uniform size averaging about 10–12 microns. Magnesia derived from other sources, such as from the Sierra deposit or from sea water, have much greater variation in particle size ranging from 2–3 microns up to very large particles and, as a result, the latter provides for a much lower bulk density ranging from 30–35 pounds per cubic foot compared to about 50 pounds per cubic foot for calcined brucite. The difference makes possible the preparation of lower viscosity or thinner slurries with equivalent amounts of magnesia so that larger amounts of glass fibers can be incorporated under comparable conditions.

Excellent results have been secured when 1.5–3 parts magnesia are combined with 3 parts by weight magnesium sulphate generally known as Epsom salts. Calculated on the weight basis it is preferred to have the materials present in the ratio of about 2–3 parts magnesia to 3 parts Epsom salts. When magnesium sulphate is present in amounts less than 20 percent by weight, the hydrate of magnesia, $Mg(OH)_2$, seem to be produced instead of forming a solid solution with the sulphate and a very weak cement results.

The glass fiber component may be incorporated in various forms. Excellent use may be made of fibers in the form of cut or chopped strands each composed of a hundred or more filaments bundled together, the strands having lengths ranging from ½–4 inches. Less advantageously, use may be made of fibers arranged in fabric form, such as bonded mat of discontinuous fibers or continuous fibers which may be arranged in a swirl pattern, or of continuous fibers in the form of a woven fabric. It is desirable that such bonded or woven fabrics be open sufficient to permit intimate contact with and passage of the binder slurry.

In the event that the fibers are derived of continuous filaments upon which a size is applied, it is preferred to make use of a size composition formed of melamine-formaldehyde resin, especially when high flexure strength is desired. Excellent use may also be made of a size formed of water soluble alkyd resins in the form of a water soluble condensation product of a polyhydric alcohol with a polybasic acid, or styrene-butadiene copolymer alone or in combination with bentonite or other clays, or a urea-formaldehyde water soluble resin. Application of the size is made in the usual manner as by wiping onto the filaments as they are drawn from the glass melting bushing and collected into bundles or else application may be made by suitable means after first removing the original size by heat treatment or washing. In the event that bonded mat is employed, it is preferred to make use of mat having a minimum amount of organic binder or to make use of bonding agents which are substantially inorganic in character, such as the organo silicon resinous compound.

Suitable aggregate may be selected of siliceous material, such as sand, flint, slate, mica dust, ground glass wool or cullet, chalk, talc and the like. It is preferred to make use of fine aggregate of uniform particle size in admixture with coarse aggregate of substantially uniform size. When such mixture of aggregates are used they should be present in the ratio of 3–5 parts by weight coarse aggregate of about 20–60 mesh to 1–3 parts by weight aggregate in which over 70 percent passes through a 200 mesh screen. It is possible to achieve the desired results by the use of aggregate in which the particle size is distributed from fine to coarse.

In practice, a slurry is formed of the cement components and aggregate and then the glass fibers are incorporated therein. The amount of fiber and manner of incorporation is limited by the high viscosity characteristic of such cement slurries. In the event that less than 4 percent fibers are to be incorporated in the form of cut or chopped strands, they may be combined with the slurry and then cast into molds for forming into intricate shapes or spread upon flat surfaces to form boards or panels. In the event that 4 or more percent glass fibers are to be incorporated, the slurry is spread upon a surface, preferably with a separator sheet therebetween and then the glass fibers are introduced and integrated into the slurry by means of a spatula, roller or other pressure means. Instead the slurry may be spread in separate thin layers one on top of the other with the glass fibers in the form of chopped or bonded mat or woven fabrics deposited on top of each layer and preferably followed by a compacting step to integrate the fibers into the layer. When such technique is used for incorporating the glass fibers into the slurry layers, it makes very little difference whether the fibers are introduced in the form of cut strands, bonded mat, woven fabric or mixtures thereof because proper integration can be obtained by subsequent treatment. Up to 20 percent glass fibers may be incorporated by this technique but the amount may be increased to about 80 percent, based upon the final product if the fibers are forced in under high pressure.

Surface active agents may be used to enhance the wetting out of the aggregate and glass fibers but usage thereof is not essential. The marked improvement in water resistance and weathering which has been claimed from the use of organic acids and salts, such as citric acid, does not seem to take place in compositions embodying the features of this invention but such acids and acid salts may be used.

After the slurry and fibers have been combined and arranged in the molds or sheet form and compressed to the desired thickness, the material may be heated for about 10–60 minutes at temperatures ranging from 150–200° F. until the cement is cured. After cure, the separator sheets should be peeled off and the product allowed to age for 1–6 days to develop maximum strength.

The conditions existing which operate to impart strength and flexibility to an inorganic cement bonded structure of the type described is not capable of explanation at this time. It is apparent, however, that the presence of fine aggregate in admixture and in combination with glass fibers provides for a type of integration which permits sheets having a dimension of $1/16$ inch or less to be rolled almost as though they were formed of paper while the sheet is further characterized by substantial imperviousness, high strength and high heat resistance. These properties have heretofore been unobtainable in inorganic cement compositions. The strength and appearance of the product are improved when the glass fibers are incorporated in the form of swirl or bonded mat with at least two and preferably three or more plies being employed so that at least one can be positioned adjacent each face of the board that is formed to impart a type of integrity and reinforcement which holds the panel together and resists cracking or rupture even though the panel may be flexed by substantial amounts. It appears that the outer ply bears the load under tension while the inner ply further imparts properties for integration. Products having a thickness greater than $1/8$ inch are stiffer and usually require as many as eight plies to develop maximum properties.

It is conceivable that the method of manufacture may follow the batch principle described or may be adjusted to continuous operation wherein the slurry is spread in a thin layer on a continuous moving belt and the glass fibers later incorporated therein in the form of discontinuous fibers or webs and pressed into the slurry layer by a squeeze roll or the like. Successive layers may be deposited to build up the desired thickness of material and after the desired number of layers have been provided, the mass may be compacted by a series of rollers as the belt passes therebetween and into an air circulating oven maintained at a temperature of about 150–200° F. for cure.

The following examples illustrate the practice of this invention:

*Example 1*

Cement formulation:
 1 part by weight magnesia (Sierra grade)
 1.5 parts by weight magnesium sulphate ($MgSO_4.7H_2O$)
 0.007 part by weight citric acid
 2 parts by weight silica (89 percent through 200 mesh)
 3 parts by weight Ottawa sand (30–60 mesh)
 1.5 parts by weight water The magnesium sulphate is dissolved in the water and placed in a mixer. Magnesia is slowly added and allowed to wet out before mixing is started. While mixing, the aggregate is added and stirring is continued for about 10 minutes.

Alternate layers of slurry and 0.6 ounce mat formed of discontinuous strands bonded with phenol formaldehyde resin are spread upon a polyvinyl chloride separator sheet. After the desired number of layers have been deposited and each layer compacted with a suitable roller, another separator sheet is placed on top. In spreading the slurry on with a trowel or the like, care should be taken to minimize retention of air bubbles to as to produce a substantially void-free product. Three plies of bonded glass mat were sandwiched in this manner between four layers of slurry and the mass further integrated by compression between squeeze rolls or platens to a thickness of about $1/8$ inch.

The form sheet was then heated in an air circulating oven for 20 minutes at 170° F. and then allowed to cool to room conditions to harden the cement and enable stripping of the separator sheets therefrom. Thereafter the material is aged for about 24 hours to 6 days at room conditions to develop optimum properties.

A structure of the type produced by this example has a density of about 110 pounds per cubic foot and flexure strength of 5500 pounds per square inch. In the falling ball impact test, the panel is able to withstand 9 drops from 9 feet; it can be nailed and suitable nailing can be effected $1/4$ inch from the edge. The board is nonflammable and can be sheared or cut to desired shapes with an abrasive wheel.

*Example 2*

Cement formulation:
 1 part by weight magnesium oxide (6 mols)
 1 part by weight magnesium sulphate (1 mol)
 1 part by weight silex sand (95 percent through 200 mesh)
 3 parts by weight sand (30–60 mesh)
 1.5 parts by weight water

*Example 3*

Cement formulation:
 1 part by weight magnesium oxide (4 mols)
 1.5 parts by weight magnesium sulphate (1 mol)
 1 part by weight silex sand (95 percent through 200 mesh)
 3 parts by weight sand (30–60 mesh)
 1.5 parts by weight water

Example 4

Cement formulation:
  1 part by weight magnesium oxide (3 mols)
  2 parts by weight magnesium sulphate (1 mol)
  1 part by weight silex sand (95 percent through 200 mesh)
  3 parts by weight sand (30–60 mesh)
  2 parts by weight water The cement compositions of Examples 2–4 inclusive are combined in the manner described in Example 1 to form a slurry and then a layer of the slurry is spread upon a separator sheet formed of highly waxed paper. Three percent by weight of glass fiber strands sized with butadiene-styrene copolymer and cut to 1 inch lengths are rained down from above to form a layer on the slurry which is then incorporated therein. The glass fibers may be forced into the slurry by a compacting roller or by spatula and then additional amounts of slurry spread on top to insure complete integration. The deposited mass may be compacted to desired thickness of about $\frac{1}{16}$–$\frac{1}{8}$ inch and then heated in an air circulating oven to a temperature of about 170° F. for about 20–30 minutes.

Although the desired results are secured with each of the formulations set forth in Examples 2–4 inclusive, best results were secured with cement compositions in which magnesium oxide and magnesium sulphate is present in the ratio of 4 to 1 on a molecular weight basis, as shown in Example 5.

Example 5

Cement formulation:
  1 part by weight magnesia
  1.5 parts by weight magnesium sulphate
  2 parts by weight potter's flint
  3 parts by weight sand (30–60 mesh)
  1.5 parts by weight water The slurry was prepared as in Example 1.

Continuous strands of glass fibers sized with butadiene-styrene copolymer and cut to 2½ inch lengths were rained down from above and incorporated by pressing into successive layers of slurry spread on a highly waxed metal plate. The fibers were added in amounts to provide 3 percent by weight of the final product and the mass compacted to about ⅛ inch thickness. The mass was then cured as set forth in Example 1 to provide a composite board. The board exhibited a flexure strength of about 5500 pounds per square inch and upon impact by the falling ball method gave merely a local fracture on the ninth drop from 9 feet. This is to be compared to the shattering of a panel of Flexboard at the seventh drop from 7 feet. Nails can be placed within ¼ inch of the edges and the panel has very good nailability.

Example 6

Cement formulation:
  2 parts by weight calcined brucite
  4 parts by weight silex
  6 parts by weight milled glass wool
  3 parts by weight magnesium sulphate
  3 parts by weight water The slurry was prepared as in Example 1.

The slurry was then spread in successive layers on a separator sheet of polyvinylidene chloride. An open mesh fabric of woven glass fibers was deposited on the first and next to the last layers and chopped glass fibers having fiber lengths distributed between ½–3 inches were rained down from above onto each of the layers of slurry in between. The fibers in the woven fabric and in the chopped strands were sized with melamine-formaldehyde resin and they were added in amounts to introduce 6–8 percent by weight glass fibers in the final product. The deposited layers were compacted by a roller following each deposition of glass fibers to compact the layers and to cause more intimate contact between the glass fibers and the slurry. After all of the layers have been so deposited, another separator sheet is placed thereon and the mass further compacted to about ⅛ inch thickness. Cure is effected at a temperature of 150° for 30 minutes and then the mass is allowed to cool at room conditions and then aged for about 6 days.

The concepts of this invention may also be practiced with magnesium oxychloride cements. With magnesium oxychloride, improved results are secured by the use of aggregate in the cement slurry in substantially the same proportion as employed with magnesium oxysulphate cement but best results are secured when the ratio of coarse and fine aggregate is about 1.5 to 1. Glass fibers ranging in amounts from 3–20 percent may be readily incorporated and further amounts up to 30 percent can be introduced by the use of pressure. The following will illustrate the practice of this invention with magnesium oxychloride cements.

Example 7

1 part by weight magnesium oxide, 1 part by weight silex (95 percent through 200 mesh), 1–5 parts by weight sand (20–30 mesh), may be combined and gauged to mortar consistency with 22° Baumé magnesium chloride solution, 3 percent glass fibers in the form of strands sized with alkyd resin and cut to 1 inch lengths may be incorporated in the manner of fabrication described for magnesium oxysulphate. After compacting, the mass may be allowed to cure at room temperature but it is preferred to effect cure by raising the temperature gradually to about 110° F. Thereafter the panel should be further aged at about 50 percent relative humidity.

Flexure strength of boards formed to ⅛ inch thicknesses range from 2200–3200 pounds per square inch and they have a modulus of elasticity ranging from $3.8$–$6.4 \times 10^6$ pounds per square inch.

Example 8

1 part by weight calcined brucite
2 parts by weight potter's flint
0.5 parts by weight coarsely milled glass wool The combined materials are gauged to mortar consistency with a 18–32° Baumé solution of magnesium chloride but preferably with a 22° Baumé solution. Glass mat in the form of swirl mat formed of continuous fibers dropped in a swirl pattern and bonded with a polystyrene resin or picker mat formed of discontinuous glass fibers dropped in a heterogeneous arrangement and bonded with 2–3 percent phenol formaldehyde resin are incorporated as two or more separate layers into layers of the slurry spread on top of a separator sheet. Compacting should follow deposition of each glass fiber layer to eliminate bubbles and insure intimate contact. Cure is effected at a temperature of 90–110° F.

Flexure strength of boards formed by the above process ranges from 1600–2000 pounds per square inch with a modulus of elasticity ranging from $3$–$8 \times 10^6$ p. s. i. Improved results are secured when the milled glass and flint are present in the ratio of 3 to 2.

Weathering and water resistance of products embodying features of this invention based upon magnesium oxychloride cement are improved by the addition of citric acid, sodium citrate, other similar organic acids and acid salts, or dimonium phosphate in amounts ranging up to 2 percent by weight. Improvement also results when the magnesia is introduced in finely divided form.

It will be understood that structural panels embodying characteristics of the type described may be prepared without aggregate and that such panels and methods for manufacturing same embody patentable invention and that other changes may be made in the details of fabrication, formulation and selection of materials based upon the criteria set forth without departing from the spirit of the invention, especially as defined in the following claims.

We claim:

1. A thin flexible inorganic sheet product consisting essentially of cured magnesium oxysulphate cement based upon components present in the ratio of 3–6 molecular equivalents of magnesium oxide to 1 molecular equivalent magnesium sulphate, siliceous aggregate material present in amounts ranging from 2–8 parts by weight thereof to one part by weight magnesium oxide, and glass fibers in fabric form to constitute plies at least one of which lies embedded adjacent and parallel to the outer walls of the product and strongly bonded to the cement to form a composite product.

2. A structural product consisting essentially of cured magnesium oxysulphate cement based upon components present in the ratio of 3–6 molecular equivalents magnesium oxide to 1 molecular equivalent magnesium sulphate, siliceous aggregates present in amounts ranging from 2–8 parts by weight per 1 part by weight magnesium oxide and distributed in the ratio of 3–5 parts by weight coarse aggregate 26–60 mesh to 1–3 parts by weight fine aggregate having 70 percent passing through 200 mesh, and glass fibers in amounts ranging from 3–27 percent by weight and distributed in the mixture and bonded by the cement into an integrated composite structure.

3. A structural product as claimed in claim 2 in which magnesium oxide is in the form of calcined brucite.

4. A structural product as claimed in claim 2 in which the glass fibers are in the form of bonded mat arranged in separate layers in the final product with at least one layer embedded in the cement lying adjacent and substantially parallel to each face and in which the materials are formed into a sheet having a thickness of less than 1/16 inch.

5. A structural product as claimed in claim 2 in which the glass fibers are present in admixture in the form of continuous glass fibers in fabric form and glass fibers in the form of strands cut to shorter lengths.

6. In the method of manufacturing thin flexible sheet products with inorganic cements, the steps of forming a slurry with water sufficient to supply the combined water for cure but insufficient to cause free flow and having magnesium oxide and magnesium sulphate present in the ratio of 3–9 molecular equivalents of magnesium oxide to 1 molecular equivalent magnesium sulphate for forming magnesium oxysulphate cement incorporating siliceous aggregates into the cement slurry in the ratio of 2–8 parts by weight of aggregate to 1 part by weight of magnesium oxide, spreading the slurry as one or more layers of less than 1/16 inch on a separable mold surface, incorporating glass fibers in the form of open mesh fabric in the slurry layers to position at least one fabric in the slurry adjacent and parallel to the outer walls of the product and then curing the cement to form the composite product.

7. In the method of manufacturing structural products with inorganic cements, the steps of forming a slurry with water sufficient to supply the combined water for cure but insufficient to cause free flow and with magnesium oxide and magnesium sulphate present in the ratio of 3–6 molecular equivalents of magnesium oxide to 1 molecular equivalent of magnesium sulphate to form a magnesium oxysulphate cement incorporating siliceous aggregates into the slurry in the ratio of 2–8 parts per one part by weight magnesium oxide, spreading the slurry in one or more successive layers on a mold surface, incorporating glass fibers in the form of open mesh fabric in an amount ranging from 3–27 percent by weight into the layers, compacting the layers as they are formed to embed the glass fibers and insure more intimate contact, and heating the mass to cure the cement and form a composite product.

8. The method as claimed in claim 7 in which the siliceous aggregate is divided between fine and coarse aggregate ranging from 1–3 parts by weight fine aggregate to 3–5 parts by weight coarse aggregate.

9. The method as claimed in claim 7 in which cure is effected by heating the mass to a temperature ranging from 150–200° F. for 10–60 minutes.

10. In the method of manufacturing structural products with inorganic cements, the steps of forming a slurry with water sufficient to supply the combined water for cure but insufficient to cause free flow and having magnesium oxide and magnesium sulphate present in the ratio of 3–9 molecular equivalents of magnesium oxide to 1 molecular equivalent magnesium sulphate for forming magnesium oxysulphate cement, spreading the slurry as one or more layers on a separable mold surface, incorporating glass fibers in the form of open mesh fabric in the slurry layers to position at least one fabric in the slurry adjacent and parallel to the outer walls of the product and then curing the cement to form the composite product.

References Cited in the file of this patent

UNITED STATES PATENTS

| Number | Name | Date |
|---|---|---|
| 872,375 | Rueff | Dec. 3, 1907 |
| 909,171 | Ellis | Jan. 12, 1909 |
| 1,853,521 | Stewart | Apr. 12, 1932 |
| 2,204,581 | Denning | June 18, 1940 |
| 2,340,209 | Skolnik | Jan. 25, 1944 |
| 2,405,528 | Skolnik | Aug. 6, 1946 |
| 2,425,883 | Jackson | Aug. 19, 1947 |
| 2,451,445 | Parsons | Oct. 12, 1948 |
| 2,451,446 | Parsons | Oct. 12, 1948 |
| 2,462,538 | Nagel | Feb. 22, 1949 |

FOREIGN PATENTS

| Number | Country | Date |
|---|---|---|
| 390,123 | Great Britain | June 22, 1931 |